United States Patent
Otagiri et al.

(10) Patent No.: US 7,336,327 B2
(45) Date of Patent: Feb. 26, 2008

(54) COLOR FILTER, ELECTRO-OPTICAL DEVICE, ELECTRONIC APPARATUS, METHOD OF MANUFACTURING COLOR FILTER SUBSTRATE, AND METHOD OF MANUFACTURING ELECTRO-OPTICAL DEVICE

(75) Inventors: Yoshihiro Otagiri, Matsumoto-shi (JP); Satoru Katagami, Hara-mura (JP); Tatsuya Ito, Matsumoto-shi (JP)

(73) Assignee: Seiko Epson Corporation (JP)

( * ) Notice: Subject to any disclaimer, the term of this patent is extended or adjusted under 35 U.S.C. 154(b) by 441 days.

(21) Appl. No.: 10/636,479

(22) Filed: Aug. 7, 2003

(65) Prior Publication Data

US 2004/0096595 A1    May 20, 2004

(30) Foreign Application Priority Data

Aug. 7, 2002    (JP) ............................. 2002-230291
Jul. 17, 2003    (JP) ............................. 2003-198705

(51) Int. Cl.
    *G02F 1/1335*    (2006.01)
(52) U.S. Cl. ..................... 349/106; 349/108; 349/114
(58) Field of Classification Search ........ 349/110–111, 349/138, 106–108, 113–114
    See application file for complete search history.

(56) References Cited

U.S. PATENT DOCUMENTS 5,689,318 A * 11/1997 Matsuyama et al. ........ 349/106
6,215,538 B1 * 4/2001 Narutaki et al. ............ 349/106

(Continued)

FOREIGN PATENT DOCUMENTS

CN    1291289    4/2001

(Continued)

OTHER PUBLICATIONS

Communication from European Patent Office re: counterpart application.

(Continued)

*Primary Examiner*—David Nelms
*Assistant Examiner*—Phu Vu
(74) *Attorney, Agent, or Firm*—Harness, Dickey & Pierce, P.L.C.

(57) ABSTRACT

A transflective color filter substrate is provided. The transflective color filter substrate comprises a transmissive color filter portion and a reflective color filter portion in one dot region. An area of the color filter colored portion is set to be less than the area of one dot region in the transflective color filter substrate, and an uncolored reflection region, which is capable of reflecting an uncolored light of high brightness without being influenced by the color filter, is formed by a partition layer. Since the pigment density of the coloring layer is set such that the transmitted light has the optimum chroma in the transmissive display mode, it is possible to obtain a displayed image having sufficient chroma in the transmissive display mode. Furthermore, in the reflective display mode, it is possible to obtain a displayed image having sufficient brightness from the colored light, which is reflected from the coloring layer, and from the bright uncolored light, which is reflected from the uncolored reflection region. As a result, it is possible to realize a transflective electro-optical device which has an excellent display quality in both the transmissive display mode and the reflective display mode.

6 Claims, 13 Drawing Sheets

U.S. PATENT DOCUMENTS

| | | | |
|---|---|---|---|
| 6,493,051 B2 * | 12/2002 | Ha et al. | 349/113 |
| 6,501,521 B2 * | 12/2002 | Matsushita et al. | 349/106 |
| 6,630,274 B1 * | 10/2003 | Kiguchi et al. | 430/7 |
| 6,870,584 B2 * | 3/2005 | Kawase et al. | 349/106 |
| 2002/0003596 A1 * | 1/2002 | Kim | 349/106 |
| 2002/0021388 A1 * | 2/2002 | Nakamura et al. | 349/106 |
| 2002/0097356 A1 * | 7/2002 | Kawase et al. | 349/106 |
| 2002/0154257 A1 | 10/2002 | Iijima | |
| 2003/0012870 A1 * | 1/2003 | Sakurada | 427/68 |
| 2003/0122998 A1 * | 7/2003 | Iijima et al. | 349/106 |

FOREIGN PATENT DOCUMENTS

| | | |
|---|---|---|
| CN | 1360220 | 7/2002 |
| EP | 1 219 980 | 12/2001 |
| JP | 59-075205 | 4/1984 |
| JP | 2001-125094 | 5/2001 |
| JP | 2001-166122 | 6/2001 |
| JP | 2001-337317 | 12/2001 |
| JP | 2002-169148 | 6/2002 |
| JP | 2002-268054 | 9/2002 |
| JP | 2002-287131 | 10/2002 |
| JP | 2002-341128 | 11/2002 |
| JP | 2003-121635 | 4/2003 |

OTHER PUBLICATIONS

Communication from Japanese Patent Office re: counterpart application.

* cited by examiner (a)

(b)

(a)

(b)

(a)

(b)

(c)

(a) X≠Y(X>Y)

(b)

(a)

(b)

COLOR FILTER, ELECTRO-OPTICAL DEVICE, ELECTRONIC APPARATUS, METHOD OF MANUFACTURING COLOR FILTER SUBSTRATE, AND METHOD OF MANUFACTURING ELECTRO-OPTICAL DEVICE

BACKGROUND OF THE INVENTION

1. Field of the Invention

The present invention relates to a transflective color filter substrate on which a plurality of color filters, such as red (R), green (G), and blue (B) color filters, are formed, a method of manufacturing the color filter substrate, and a method of manufacturing an electro-optical device. In addition, the present invention relates to an electro-optical device and an electronic apparatus employing the color filter substrate.

2. Related Art

A reflective liquid crystal display device has advantages in that the power consumption thereof is small because it does not use a light source, such as a back light, and in that the portability thereof is excellent because the reflective liquid crystal display device can be made very thin. For these reasons, the reflective liquid crystal display device has been widely used in display units of various portable electronic apparatuses. However, since the reflective liquid crystal display device displays images using an external light source, such as natural light or an illuminator, there is a disadvantage in that the visibility of the display deteriorates in a dark place.

Therefore, a liquid crystal display device has been suggested, in which the visibility has been improved by using an external light source in a bright place similarly to a conventional reflective liquid crystal display device and by using a light source, such as a back light attached to the display device, in a dark place. That is, since this liquid crystal display device employs a display method combining the reflective display mode and the transmissive display mode, it can switch the display mode into either the reflective display mode or the transmissive display mode depending upon the circumstantial brightness. Using this transflective liquid crystal display device combining the reflective display mode and the transmissive display mode, it is possible to decrease the power consumption and to display a high quality image even when it is dark.

Recently, as portable electronic apparatuses are widely popularized, it is desirable to colorize a liquid crystal display device. Furthermore, it is also desirable to colorize an electronic apparatus, which is provided with the aforementioned transflective liquid crystal display device. A transflective liquid crystal display device provided with a color filter substrate is used as the transflective color liquid crystal display device to meet the requirements.

In the transflective display mode of the transflective color liquid crystal display device, the incident light from the external light source into the liquid crystal display device passes through a color filter, and is reflected from a reflective film provided below the color filter. Then, the reflected light passes through the color filter again, and then reaches an observer. In brief, the external light passes through the color filter two times. Furthermore, in the transmissive display mode, the light emitted from a light source, such as a back light, passes through the color filter one time, and then reaches the observer. For this reason, when the same color filter substrate is commonly used in both the transmissive display mode and the reflective display mode, there is a disadvantage in that the chroma or brightness of the displayed image in each display mode is insufficient.

That is, when a color filter having low pigment density is used to obtain an optimum chroma in the reflective display mode, the chroma of the displayed image is apt to be insufficient in the transmissive display mode. On the other hand, when a color filter having high pigment density is used to obtain an optimum chroma in the transmissive display mode, the brightness of the displayed image is apt to be insufficient in the reflective display mode.

For this reason, a transflective liquid crystal display device capable of compensating for the lack of the brightness in the reflective display mode has been suggested, wherein the density of the color filter substrate in the transflective liquid crystal display device is set so as to obtain an optimum chroma in the transmissive display mode, and the color filter substrate has regions in which the color filters are not provided in a reflective display region, that is, regions (hereinafter, referred to as "uncolored reflection regions") in which a reflective film is not covered with the color filters. In this transflective liquid crystal display device, a reflective film is formed on one of a pair of glass substrates that constitute a liquid crystal panel, and color filters are formed on the reflective film using the photolithography method. However, in the uncolored reflection region formed by the photolithography method, the color filters have concave portions, and thus there is a disadvantage in that the flatness of the color filters is compromised.

The present invention is provided to solve the above disadvantages, and it is an object of the present invention to provide a color filter substrate, an electro-optical device, and an electronic apparatus capable of improving the brightness of the reflective display and the chroma of the transmissive display using an inkjet method and of reducing manufacturing cost, and to provide a method of manufacturing the color filter substrate and a method of manufacturing an electro-optical device.

SUMMARY

According to an aspect of the present invention, a color filter having dot portions surrounded with light-shielding regions is provided, wherein each of the dot portions comprises a region in which a coloring layer is formed by coating a liquid droplet material, and a region in which a partition layer is formed, the partition layer being substantially transparent and partitioning the region in which the coloring layer is formed from a region in which the coloring layer is not formed.

According to the aforementioned color filter, a part of the reflection region has a stacked structure of the partition layer and the reflective layer, and the other parts thereof have a stacked structure of the coloring layer and the reflective layer. Since the incident light is reflected as an uncolored and bright reflected light by the stacked structure of the partition layer and the reflective layer, it is possible to compensate for the lack of brightness in the reflective display mode.

In one aspect of the aforementioned color filter, each of the dot portions comprises a transmission region capable of substantially transmitting light and a reflection region having a reflective layer for reflecting light. The transmission region has the coloring layer, and the reflection region has a region in which the coloring layer and the reflective layer two-dimensionally overlap each other and a region in which the partition layer and the reflective layer two-dimensionally overlap each other. Furthermore, in each of the dot portions, an area of the coloring layer is less than the total area of the transmission region and the reflection region in the dot portion. As a result, a region having the stacked structure of the partition layer and the reflective layer is obtained.

In another aspect of the color filter, the partition layer has an area greater than the light-shielding region and is provided to cover the light-shielding region. Thus, it is possible to obtain the uncolored and bright reflected light from the stacked structure of the partition layer and the reflective layer in a region broader than the light-shielding region.

The reflective layer may have a light-shielding function. Furthermore, the partition layer may be provided on a peripheral region of the dot in the reflection region. Moreover, the partition layer may also be provided inside the peripheral region of the dot in the reflection region. In addition, the partition layer may be provided inside at least two opposite sides of the four circumferential sides in the peripheral region of the dot.

The reflective layer may include a metal layer. Furthermore, a transparent conductive layer may be provided on at least a part of the partition layer. By doing so, a part of the partition layer in which the transparent conductive film is provided functions as a part of the dot region.

An electro-optical device can be constructed comprising: a color filter according to any one of the aforementioned color filters, first displaying electrodes provided to two-dimensionally overlap with at least the transmission region and the reflection region, and second displaying electrodes opposite to the first displaying electrodes, wherein the dot portions are formed to correspond to positions where the first electrodes and second electrodes overlap each other.

Furthermore, one aspect of the aforementioned electro-optical device comprises a pair of substrates that are opposite to each other, wherein the reflective layer is disposed on one of a pair of substrates, and the color filter is disposed on the other substrate. Furthermore, an electronic apparatus comprising the aforementioned electro-optical device as a display unit can be constituted.

In another aspect of the present invention, a method of manufacturing a color filter comprises the steps of: forming a reflective layer on a substrate; forming a black mask in a region corresponding to a light-shielding region on the reflective layer; forming a partition layer to cover the black mask and to have an area greater than the black mask; and forming coloring layers in a plurality of regions partitioned by the partition layer.

According to this method, the partition layer has an area greater than the black mask corresponding to the light-shielding region on the reflective layer, and is provided to cover the black mask.

As a result, uncolored and bright reflected light can be obtained in the regions greater than the black mask.

In another aspect of the present invention, a method of manufacturing a color filter comprises the steps of: forming a reflective layer on a substrate; forming a partition layer for partitioning dot regions on the reflective layer; forming coloring layers in the plurality of regions partitioned by the partition layer; and forming a transparent conductive film on at least a portion of the partition layer.

According to this method, the transparent conductive film can be provided on the partition layer. By doing so, the region provided with the transparent conductive film in the partition layer-forming region can function as a portion of the dot region.

In another aspect of the present invention, a method of manufacturing an electro-optical device comprises a step of manufacturing a color filter substrate by using the aforementioned method of manufacturing a color filter substrate.

DETAILED DESCRIPTION

Now, preferred embodiments of the present invention will be described with reference to the drawings.

Color filter substrate

First Embodiment

Figure 1:
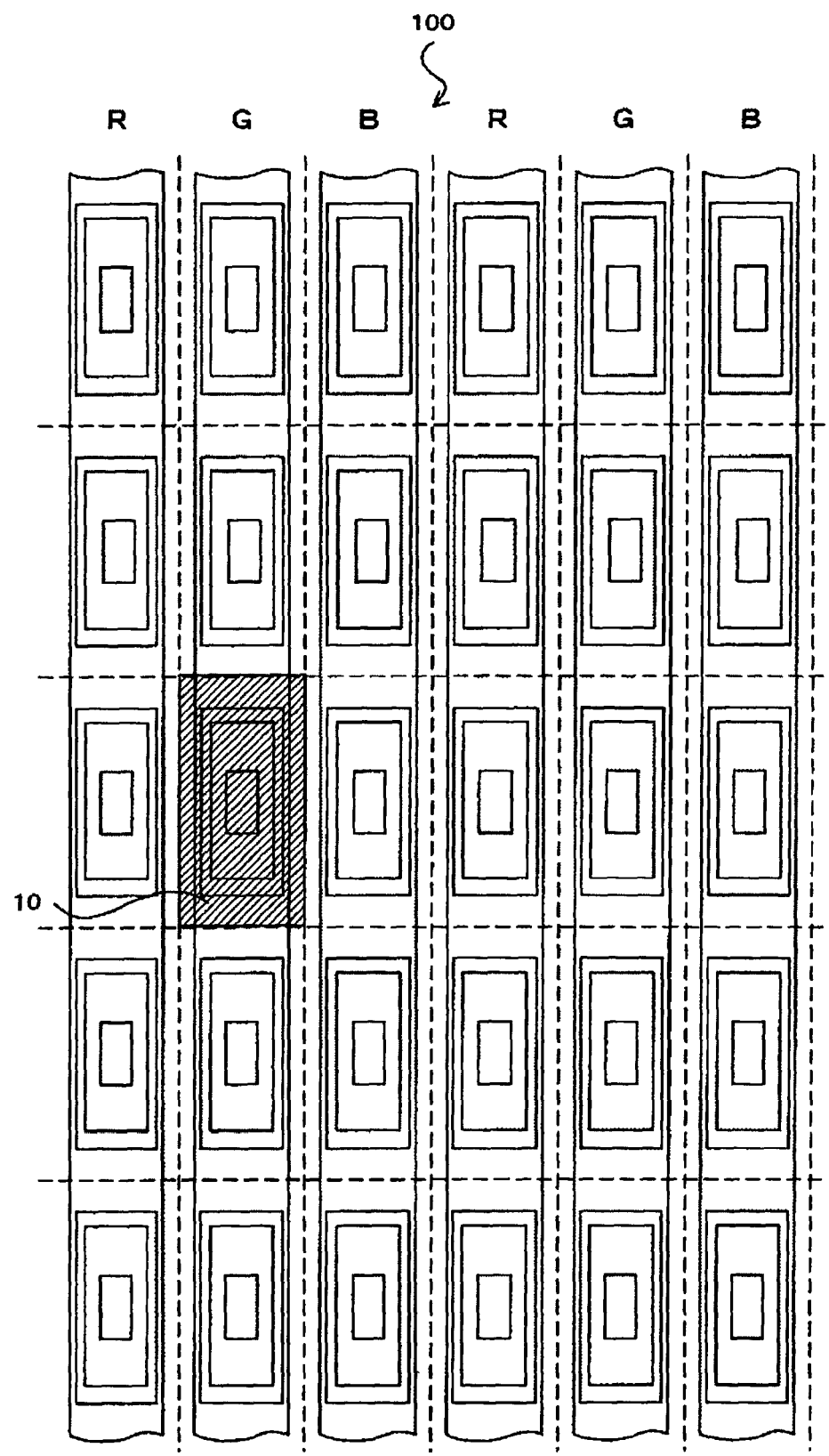
FIG. 1 is a plan view of a color filter substrate according to a first embodiment of the present invention.

FIG. 1 shows a plan view of a color filter substrate according to a first embodiment of the present invention. The color filter substrate 100 comprises a plurality of dot portions 10. The dot portions 10 are formed in portions where transparent electrodes 6 (see FIG. 2(b)) and displaying electrodes (not shown) opposite to the transparent electrodes 6 are two-dimensionally overlapped each other. Each of the dot portions 10 corresponds to any one of R, G and B colors, and in the example of FIG. 1, the dot portions 10 having the same color are arranged in the vertical direction. One pixel comprises three dot portions 10 of R, G and B which are arranged repeatedly in the horizontal direction of the drawing.

Figure 2:
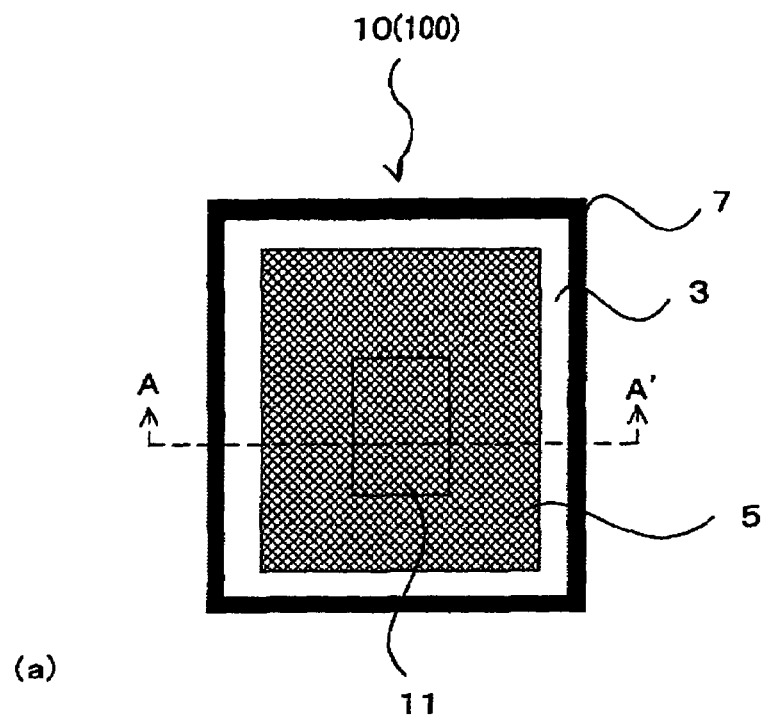
FIG. 2(a) is a plan view and FIG. 2(b) is a cross-sectional view of a dot portion in the color filter substrate shown in FIG. 1.
Figure 2:
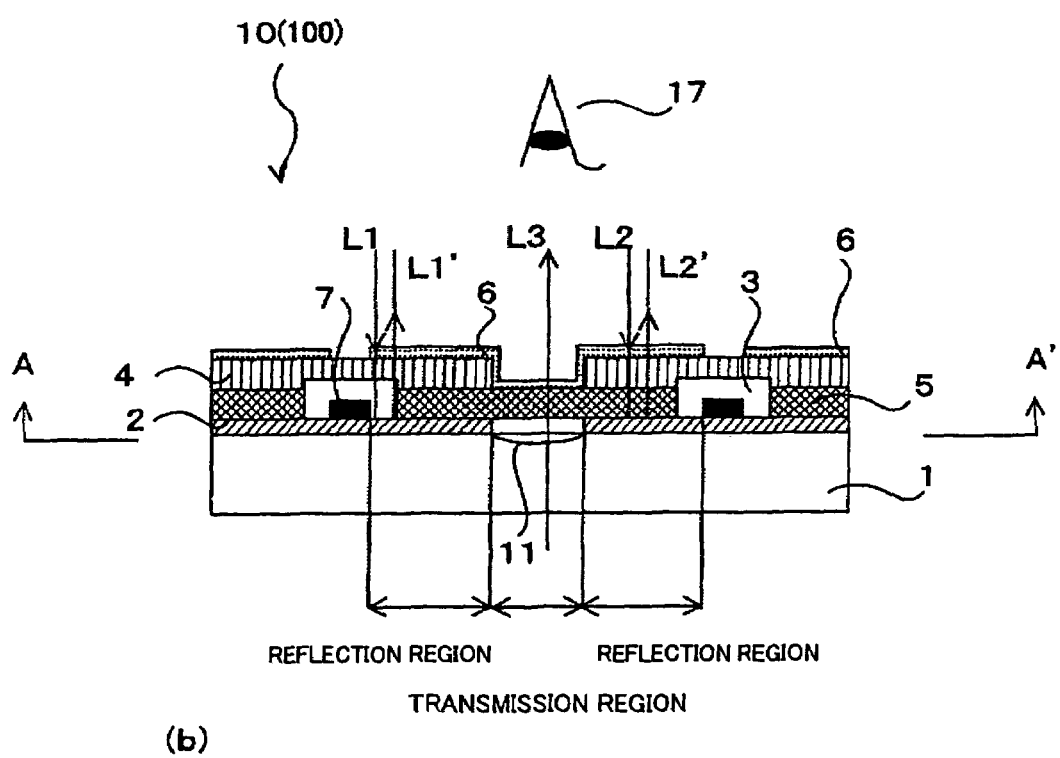

FIG. 2(a) is a plan view in which one of the dot portions 10 shown in FIG. 1 is enlarged. Furthermore, FIG. 2(b) is a cross-sectional view of the dot portion 10 taken along a line A-A' in FIG. 2. As shown in FIGS. 2(a) and 2(b), the color filter substrate 100 is constructed by forming a reflective film 2 made of, for example, Al film on a light-transmissive substrate 1 made of a material, such as glass or plastic. The reflective film 2 has an aperture 11, which is a transmission region, in the vicinity of the center of the one dot portion 10. The aperture 11 transmits an illuminated light from a light source, such as a back light, in a transmissive display mode.

A black mask 7 is formed on the reflective film 2, and a partition layer 3 (hereinafter, referred to as a bank layer in the embodiments), which is a partition member, is formed on the reflective film 2 to cover the black mask 7. A coloring layer 5 having any one color of R, G and B is formed within a region surrounded by bank layers 3, which are adjacent to each other, by an inkjet method as described later. The bank layer 3 is made of a transparent photosensitive resin having an ink-shedding property, and functions to prevent the ink (liquid droplet material) of the neighboring coloring layers 5 from being mixed when the coloring layers 5 are formed by the inkjet method (a film forming method using ejection of liquid droplet material).

A transparent resin, such as acryl resin, is formed on the bank layer 3 and the coloring layer 5 as an overcoat layer (protective film) 4. However, since this embodiment refers to a color filter that is capable of being applied to a so-called multi-gap method liquid crystal panel, the overcoat layer 4 is not formed on the coloring layer 5 of the transmission region corresponding to the aperture 11. The multi-gap method liquid crystal panel will be described later. In addition, a transparent electrode 6, such as ITO electrode, is formed on the overcoat layer 4.

As described above, the bank layer 3 functions as a partition member when forming the coloring layer 5 using the inkjet method. In general, the bank layer 3 is formed only on the black mask 7 circumscribing the dot portion 10 of each color, but this embodiment is characterized in that the bank layer 3 is formed to have a width larger than that of the black mask 7 by increasing the width of the bank layer 3. As shown in FIGS. 2(a) and 2(b), the coloring layer 5 of the color filter is not formed in a region in which the bank layer 3 is formed. Since the overcoat layer 4 and the transparent electrode 6 both are made of transparent materials, a region, where the black mask 7 is not formed, of the bank layer 3 region functions as the exposed reflective film 2 from the point of view of coloring light. That is, in the region, where the black mask 7 is not formed, of the bank layer 3 region, the external light L1 traveling from the upper direction to the lower direction of FIG. 2(b) is reflected from the reflective film 2 without passing through the coloring layer 5, and then reaches the exterior of the color filter substrate 100 as the uncolored and bright reflected light L1'.

On the other hand, in a region, where the coloring layer 5 is formed, in the reflection region, the external light L2 passes through the coloring layer 5 to the reflective film 2, and then is reflected from the reflective film 2. Then, the reflected light passes through the coloring layer 5 again, and then reaches the exterior of the color filter substrate 100 as the reflected light L2'. Therefore, the external light L2 is perceived by an observer 17 as a colored light corresponding to the color of the coloring layer 5. In addition, in the transmission region, the illuminated light (transmitted light) L3 from the back light source (not shown) passes through the aperture 11 and passes the coloring layer 5 one time, and then is perceived by the observer 17 as a colored light corresponding to the color of the coloring layer 5.

In the color filter substrate 100 shown in FIG. 2, the pigment density of the coloring layer 5 is set such that the transmitted light L3 exhibits an optimal chroma. Therefore, since the reflected light L2' passes two times through the coloring layer 5 that is set optimally for the transmitted light, the reflected light has insufficient brightness. However, in the region, where the black mask 7 is not formed, of the bank layer 3 formed region in the reflection region, the external light L1 is reflected from the reflective film 2 without passing-through the coloring layers 5, and then emitted from the reflective film 2 to the outside as the uncolored and bright reflected light L1'. Thus, the lack of brightness in all the reflection regions can be compensated by the reflected light L1'.

The area of the bank layers 3, more specifically, the area of the region other than the black mask 7 in the bank layer 3 regions is determined in consideration of the brightness required for all the reflection regions. That is, if the area of the bank layer 3 is small, the brightness of the reflected light in all the reflection regions is insufficient, and thus the brightness of the displayed image is insufficient. On the other hand, if the area of the bank layer 3 is excessively large, the brightness in all the reflection regions excessively increases, and thus the displayed image in the reflective display mode is only bright, and the chroma of the displayed image is insufficient. Therefore, in order to obtain brightness suitable for the reflective display mode, the area of the bank layers 3, that is, how broadly the bank layer 3 should be formed in consideration to the width of the black mask 7, should be determined.

As described above, according to this embodiment, when the coloring layer having various colors is formed in the color filter using the inkjet method, the bank layer 3 is formed more broadly than the black mask 7. As a result, in the portions in which the width of the bank layer 3 is larger than that of the black mask 7, the reflected light L1' is a bright light that does not pass through the coloring layer 5. Thus, it is possible to solve the lack of brightness of the displayed image in the reflective display mode.

Second Embodiment

Figure 3:
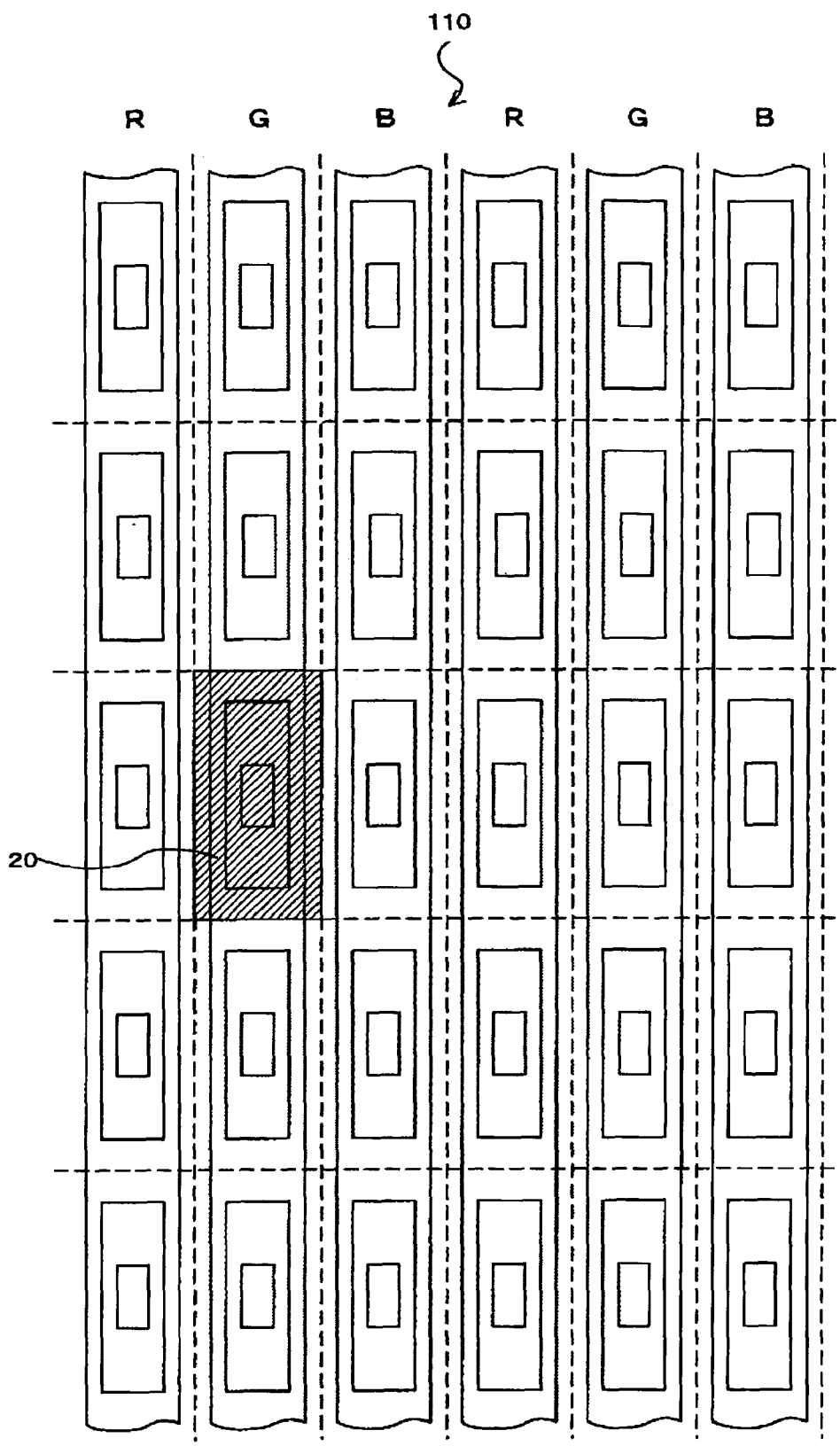
FIG. 3 is a plan view of a color filter substrate according to a second embodiment of the present invention.

Next, a color filter substrate according to a second embodiment of the present invention will be described. FIG. 3 is a plan view illustrating a color filter substrate 110 according to the second embodiment. FIG. 4(a) is a plan view illustrating one dot portion 20 of the color filter substrate 110 shown in FIG. 3, and FIG. 4(b) is a cross-sectional view taken along a line B-B' shown in FIG. 4(a).

Figure 4:
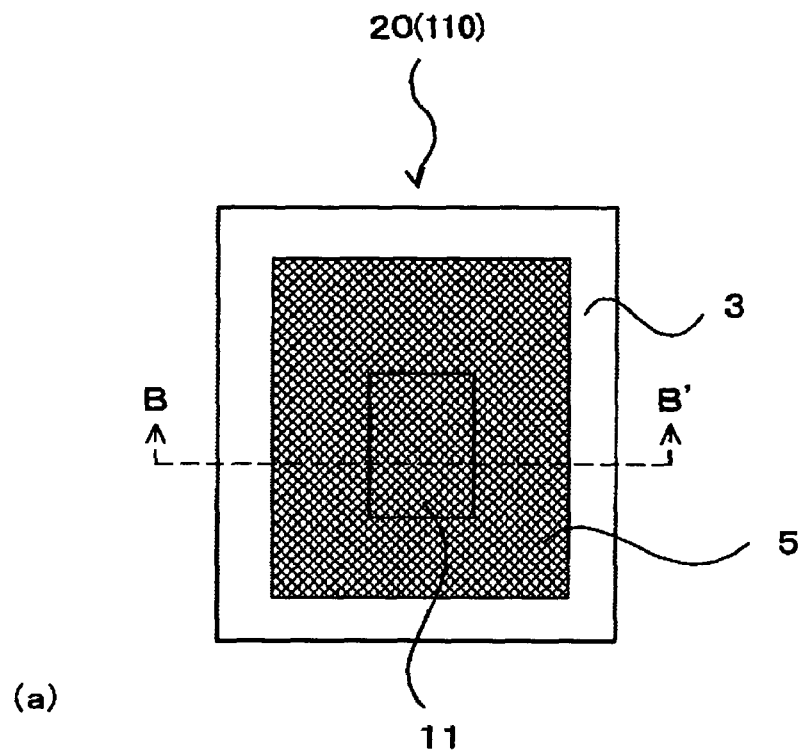
FIG. 4(a) is a plan view and FIG. 4(b) is a cross-sectional view of a dot portion in the color filter substrate shown in FIG. 3.
Figure 4:
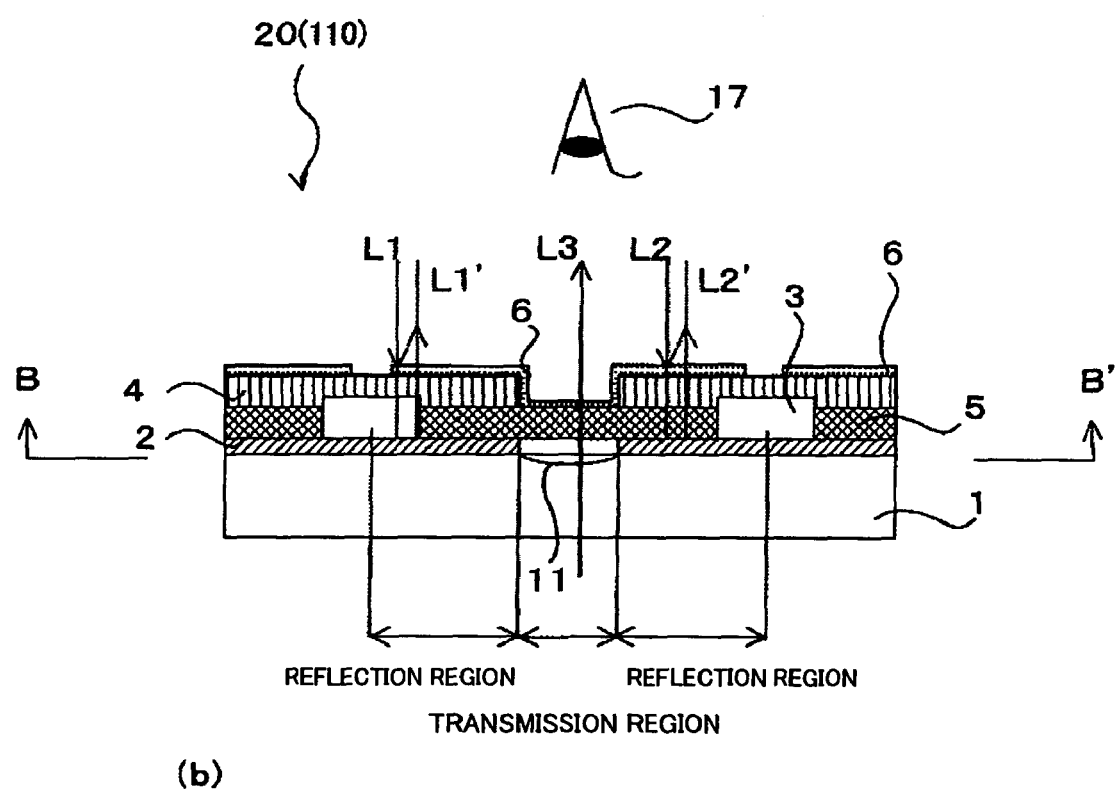

The color filter substrate 110 of the second embodiment is different from the color filter substrate 100 of the first embodiment in that its constitution does not include a black mask. That is, as shown in FIGS. 3 and 4, in the dot portion 20 of the color filter substrate 110, the bank layer 3 is formed on the reflective film 2 but the black mask is not formed. The color filter substrate 110 of the second embodiment has the same structure as the color filter substrate 100 of the first embodiment except for the structure of the bank layer 3.

That is, in the transmission region, the illuminated light from, for example, the back light source reaches the observer 17 as the transmitted light L3 through the aperture 11 and the coloring layer 5. Since the chroma of the coloring layer 5 is set so as to obtain the optimal chroma in the transmissive display mode, the image displayed by the transmitted light L3 has the optimal chroma. On the other hand, since the external light L2 incident from the region of the reflective region, where the coloring layer 5 is formed, passes through the coloring layer 5 two times before and after the reflection by the reflective film 2, and then exits from the color filter substrate as the reflected light L2'. Thus, the brightness of the reflected light L2' is insufficient. However, since the uncolored reflected light L1', which does not pass through the coloring layer 5, is obtained from the bank layer 3 region in the reflection region, the lack of the brightness in the reflective display mode can be made good as a whole.

Third Embodiment

Figure 5:
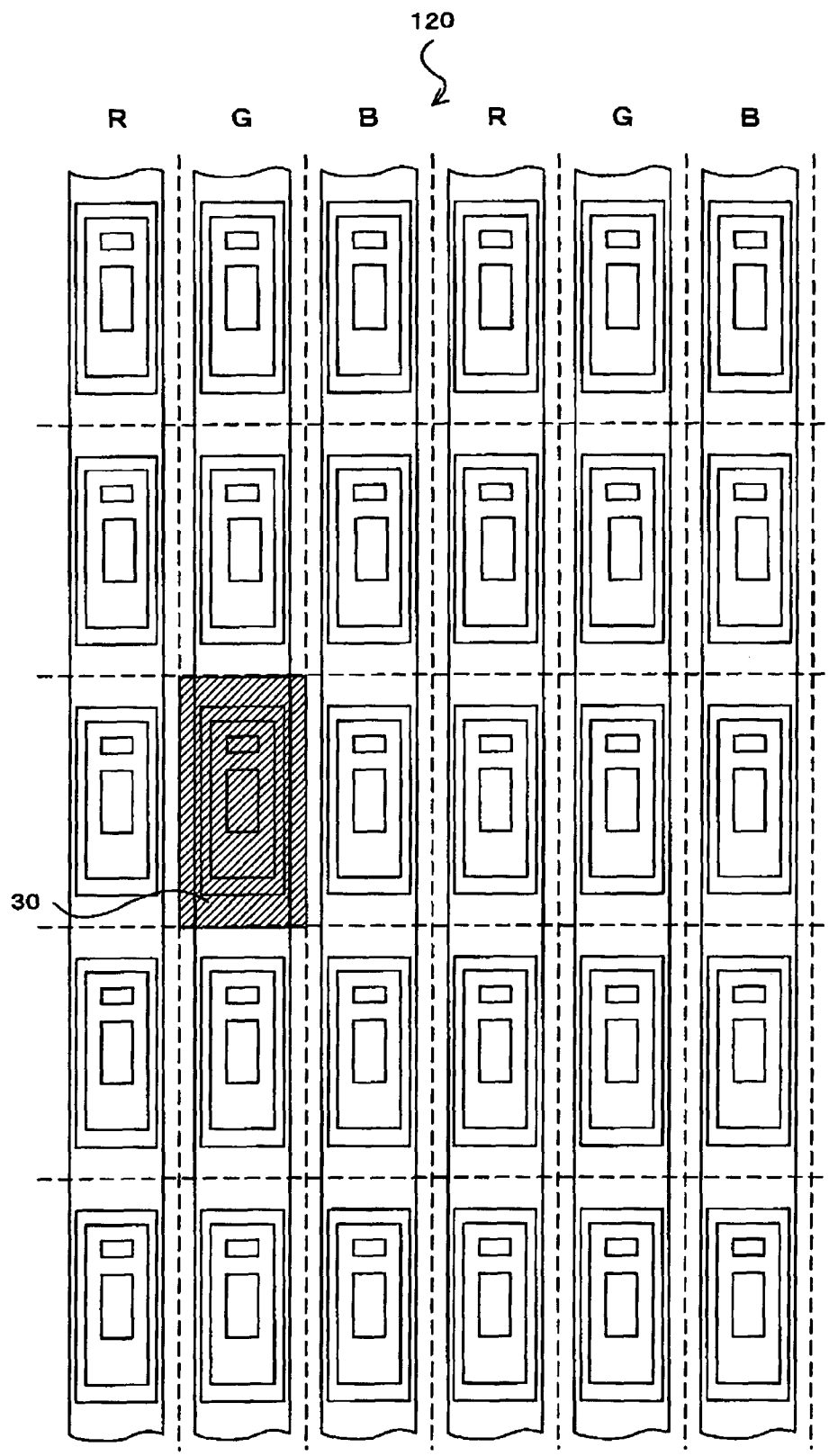
FIG. 5 is a plan view of a color filter substrate according to a third embodiment of the present invention.

Next, a color filter substrate according to a third embodiment of the present invention will be described. FIG. 5 is a plan view of the color filter substrate 120 according to the third embodiment. FIG. 6(a) is a plan view illustrating one dot portion 30 of the color filter substrate 120 shown in FIG. 5, FIG. 6(b) is a cross-sectional view taken along a line C-C' shown in FIG. 6(a), and FIG. 6(c) is a cross-sectional view taken along a line D-D' shown in FIG. 6(a).

The color filter substrate 120 of the third embodiment is characterized in that island-shaped bank region 12 is formed on the reflective film 2 at the same time of the formation of the bank layer 3. That is, as shown in FIG. 6(a), the island-shaped bank region 12 is formed in the coloring layer 5 forming region of the color filter, and the coloring layer 5 is not formed in the island-shaped bank region 12. As a result, the island-shaped bank region 12 functions as an uncolored reflection region. That is, similar to the region, where the bank layer 3 is formed, in the first and second embodiments, the light reflected from the island-shaped bank region 12 does not pass through the coloring layer 5, and thus a. uncolored and bright reflected light is obtained.

Specifically, as shown in the cross-sectional view of FIG. 6(b), the dot portion 30 is constructed by forming the reflective film 2, such as Al (aluminum) film, on the light-transmissive substrate 1 made of, for example, glass or plastic. The reflective film 2 has an aperture 11 in the vicinity of the center in the one dot portion 10. The aperture 11 functions to transmit the illuminated light from the back light source and others in the transmissive display mode.

The black mask 7 is formed on the reflective film 2, and the bank layer 3, which is a partition member, is formed on the reflective film 2 to cover the black mask 7. Furthermore, in this embodiment, the bank layer 3 is formed on the black mask 7. In the region surrounded by the bank layers 3 which are adjacent to each other, as described later, the coloring layer 5 of any one of the R, G and B colors is formed using the inkjet method. The bank layer 3 functions to prevent the ink of the coloring layers 5 adjacent to each other from being mutually mixed when the coloring layers 5 are formed using the inkjet method.

The overcoat layer (protective film) 4 made of a transparent resin, such as acryl resin, is formed on the bank layer 3 and the coloring layer 5. However, since a so-called multi-gap method color filter is used in this embodiment, the overcoat layer 4 is not formed on the coloring layer 5 of the transmission region corresponding to the aperture 11. Then, the transparent electrode 6, such as ITO electrode, is formed on the overcoat layer 4.

FIG. 6(c) illustrates a cross-section view taken along a line D-D' shown in FIG. 6(a). As shown in FIG. 6(c), in the dot portion 30, the reflective film 2 is formed on the other regions of the substrate 1 except for an aperture 11. Furthermore, the black mask 7 circumscribing the neighboring dot portions 30 is formed on the reflective film 2, and the bank layer 3 is formed on the black mask 7.

Then, the island-shaped bank region 12 is formed in a predetermined position on the reflection region, that is, the reflective film 2, at the same time of the formation of the bank layer 3. Thereafter, the coloring layer 5 is formed in the region partitioned with the bank layer 3 by the inkjet method. However, since the island-shaped bank region 12 is made of the same ink-shedding resin as the bank layer 3, the coloring layer 5 is not formed on the island-shaped bank region 12. Then, the overcoat layer 4 is formed in the other regions except for the transmission region corresponding to the aperture 11, and the transparent electrode 6, such as ITO electrode, is formed on the overcoat layer 4.

The island-shaped bank region 12 is formed on the reflective film 2, and the coloring layer 5 is not formed on the island-shaped bank region 12. Therefore, in the island-shaped bank region 12, the external light L4 is reflected from the reflective film 2, and then the observer perceives the uncolored reflected light. Similar to the first and second embodiments, since the pigment density of the coloring layer 5 is determined such that the transmitted light has the optimal chroma, the brightness of the reflected light decreases as compared with the brightness of the transmitted light. However, since the uncolored and bright reflected light is obtained in the island-shaped bank region 12 of the reflection region, the reflected light having sufficient brightness can be obtained from all the reflection regions.

That is, according to the first and second embodiments, the bank layers 3 are provided at the borders of the adjacent dot portions 10 or 20 and function as uncolored reflection regions to obtain the uncolored and bright reflected light. However, according to the third embodiment, the island-shaped bank regions 12 having a predetermined area are provided at the predetermined positions in the reflection regions, and function as the uncolored reflection regions to obtain the uncolored and bright reflected light.

The area of the island-shaped bank region 12 is determined by considering how bright it is required to be for the whole reflection region. That is, if the area of the island-shaped bank region 12 is small, the brightness of the reflected light is insufficient in the whole reflection region, and thus the brightness of the displayed image is insufficient. On the other hand, if the area of the island-shaped bank region 12 is excessively large, the brightness in the whole reflection region excessively increases. Thus, in the reflective display mode, the brightness of the displayed image increases, but the chroma thereof decreases. Therefore, the area of the island-shaped bank region 12 should be determined to obtain the brightness suitable for the reflective display mode.

Furthermore, in this embodiment, the bank layer 3 is formed only on the black mask 7 as shown in FIGS. 6(b) and 6(c). However, similarly to the first embodiment shown in FIG. 2(b), the bank layer 3 may be formed to be broader than the black mask 7, and so the uncolored and bright reflected light can be obtained from both of the island-shaped bank region 12 and the ring-shaped portion of the bank layer 3 which is formed inside the black mask 7.

Since concave portions, which do not include the coloring layers, are generated in the uncolored portions when using the conventional photolithography method, the whole color filter can be flattened. Thus, there may be a problem that the overcoat layer 4 corresponding to the concave portions is not flattened. However, using the method to form the island-shaped bank regions 12, since the bank members are provided in the island-shaped bank regions 12, the concave portions are not formed. Therefore, there is an advantage that the color filter can be flattened.

Modification of Color Filter Substrate

Figure 7:
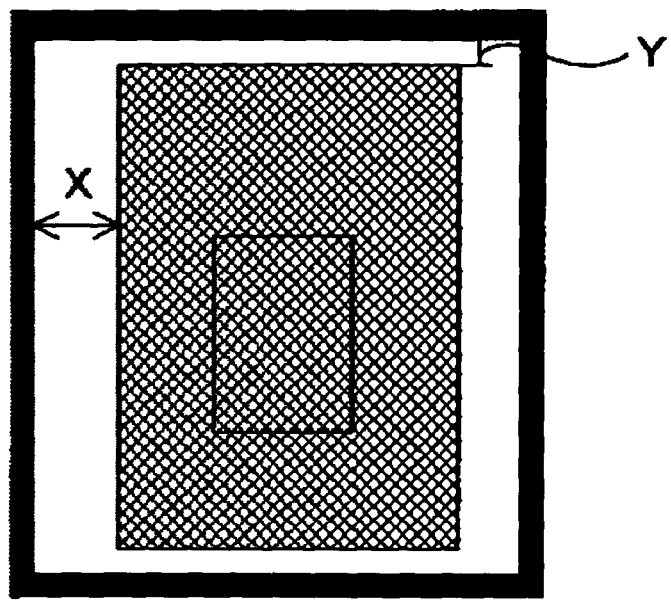
FIGS. 7(a) and (b) are plan views of a dot portion in a modification of the color filter substrate.
Figure 7:
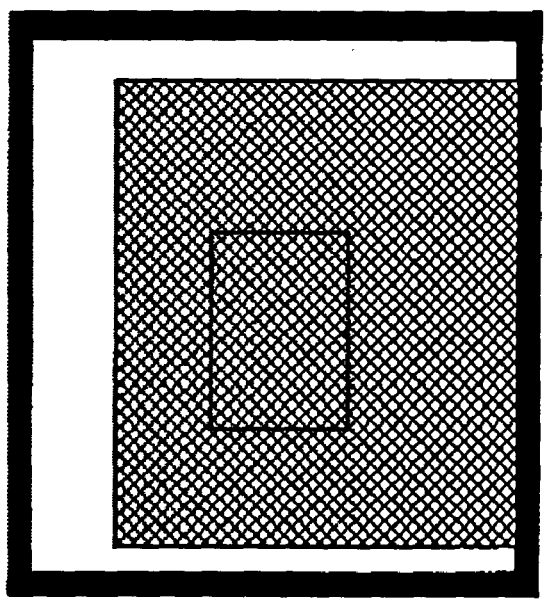

In the color filter substrate 100 of the first embodiment, as shown in FIG. 2(b), the uncolored reflection region (bank layer 3), which is formed inside the ring-shaped black mask 7, is formed interior to the black mask 7 by the same width along the four sides thereof. Alternatively, as shown in FIG. 7(a), the uncolored reflection regions inside the black masks 7 may be formed with different widths of the vertical side and the horizontal side. In the example of FIG. 7(a), it is shown that the width X in the horizontal direction in the ring-shaped uncolored reflection region is greater than the width Y in the vertical direction. On the contrary, the bank layer 3 may be formed such that the width X in the horizontal direction is smaller than the width Y in the vertical direction.

Furthermore, in the color filter substrate 100 of the first embodiment, as shown in the cross-sectional view of FIG. 2(b), the position of the black mask 7 in the bank layer 3 is approximately at the center in the width direction of the bank layer 3. That is, the bank layer 3 expands from both edges of the bank layer 7 by the substantially same width. Alternatively, as shown in FIG. 7(b), the black mask 7 may be disposed closer to any one end of the bank layer 3. In the example of FIG. 7(b), the black mask 7 is located at the left end in the bank layer 3, so that the bank layer 3 and the black mask 7 are opposite to each other.

Figure 8:
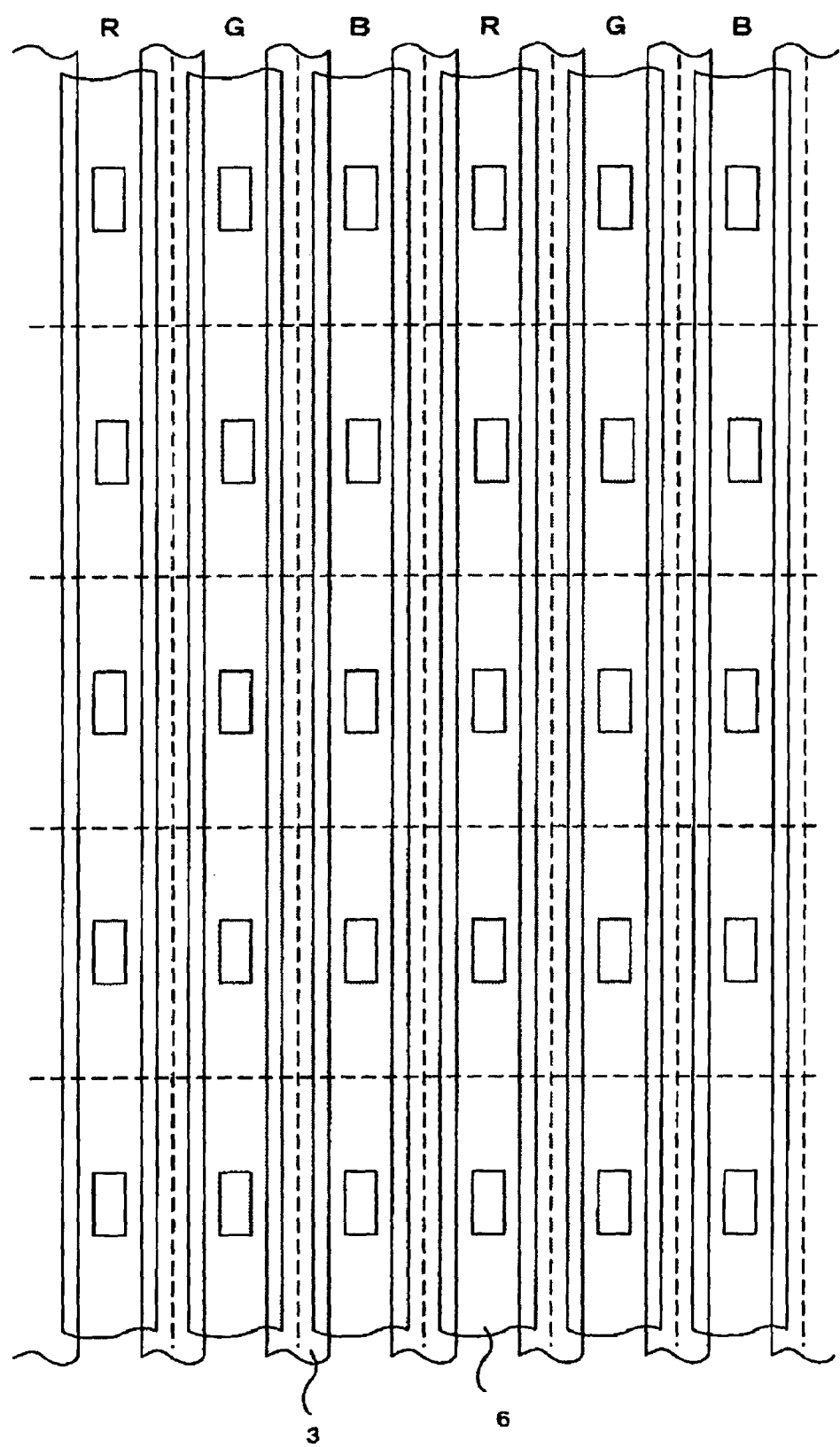
FIG. 8 is a plan view illustrating another modification of the color filter substrate.

Furthermore, in the first to third embodiments of the aforementioned color filter substrate, the bank layers 3 are formed in positions corresponding to the four (top and bottom, and right and left) sides of one dot portion. However, as shown in FIG. 8, the bank layers 3 may be omitted at the boundary surfaces between the dot portions which form the same coloring layer. In the example of FIG. 8, the dot portions of each of the R, G and B colors are arranged in the horizontal direction, and the same coloring layers are provided in the dot portions that are arranged in the vertical direction. Therefore, even if the bank layers 3 are not formed at the boundary surface between the dot portions which are adjacent to each other in the vertical direction, the disadvantage of the mixture of ink color does not occur because the coloring layer in the vertical direction has the same color.

Furthermore, in the respective embodiments, the width or area of the bank layer 3 is the same regardless of the colors (R, G, B) of the dot portions. However, when it is necessary that the brightness in the reflective display mode be adjusted for every color, the width or area of the bank layers 3 to be formed in the dot portions may be different for every color.

Furthermore, in order to prevent the mixture of ink color in the boundary surfaces between the dot portions which have different colors and are adjacent to each other, the width of the bank layers 3 is usually required to be a minimum of 6 μm. Therefore, even when the black mask 7 is formed in the bank layer 3 as in the first embodiment or the black mask is not formed therein as in the second embodiment, it is preferable that the width of the bank layer 3 be about 6 μm or more. Furthermore, when the black mask 7 is formed in the bank layer 3 as in the first embodiment, the width of the bank layer 3 is naturally greater than that of the black mask 7.

Liquid Crystal Display Panel

Next, a construction of a liquid crystal display panel using the aforementioned color filter substrate will be described.

Figure 9:
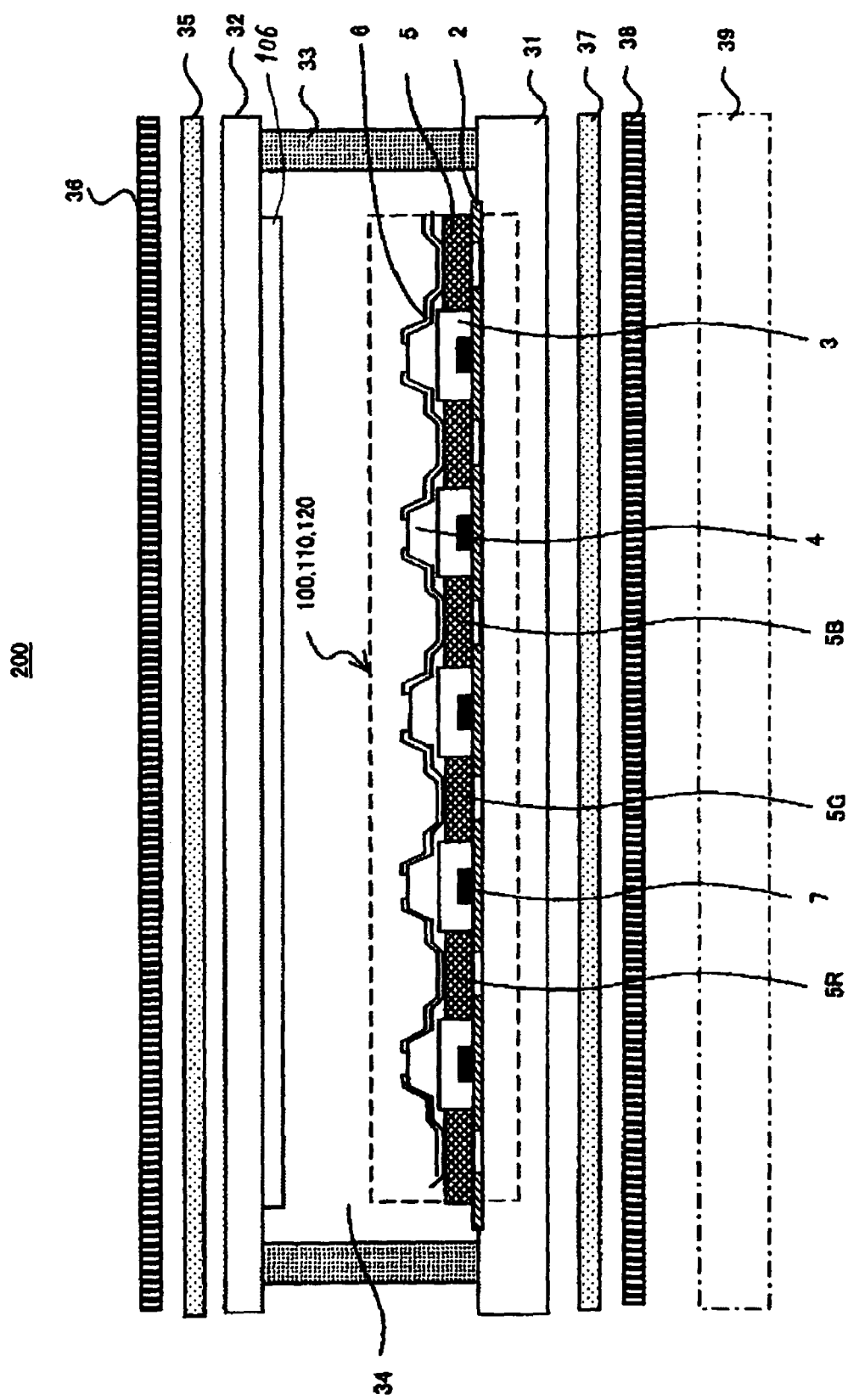
FIG. 9 is a cross-sectional view illustrating a construction of a liquid crystal display panel provided with the color filter substrate of the present invention.

In FIG. 9, in the liquid crystal display panel 200, a substrate 31 and a substrate 32 made of, for example, glass or plastic are bonded by a sealing member 33, and liquid crystal 34 is filled and sealed between the substrates 31 and 32. Furthermore, a phase difference plate 35 and a polarizing plate 36 are arranged in sequence on the outer surface of the substrate 32, and a phase difference plate 37 and a polarizing plate 38 are arranged in sequence on the outer surface of the substrate 31. Furthermore, a back light 39 for emitting light in the transmissive display mode is provided below the polarizing plate 38. Furthermore, each of a plurality of dot portions (not shown) is formed in portions where transparent electrodes (displaying electrode) 6 and a displaying electrode 106 opposite to the transparent electrodes 6 are overlapped to each other.

In the multi-gap type liquid crystal display device as shown in FIG. 9, by employing the multi-gap type constitution, the thickness of the liquid crystal layer between the transmission display region and the reflection display region is adjusted, so it is possible to improve the brightness and the color tone of the liquid crystal display.

Furthermore, in the present invention, the arrangement of each coloring layer in the color filter is not limited to the arrangement shown in FIGS. 1, 3, 5 and 8. That is, various arrangements, such as a delta arrangement, a diagonal arrangement, can be employed in addition to the stripe arrangement. The transmissive color filter and the reflective color filter may be made of the same material, and these color filters may be made of different materials, respectively. In another application, a color filter in which the thickness varies in the transmission display region and the reflective display region may be employed.

Method of Manufacturing Color Filter Substrate

Figure 10:
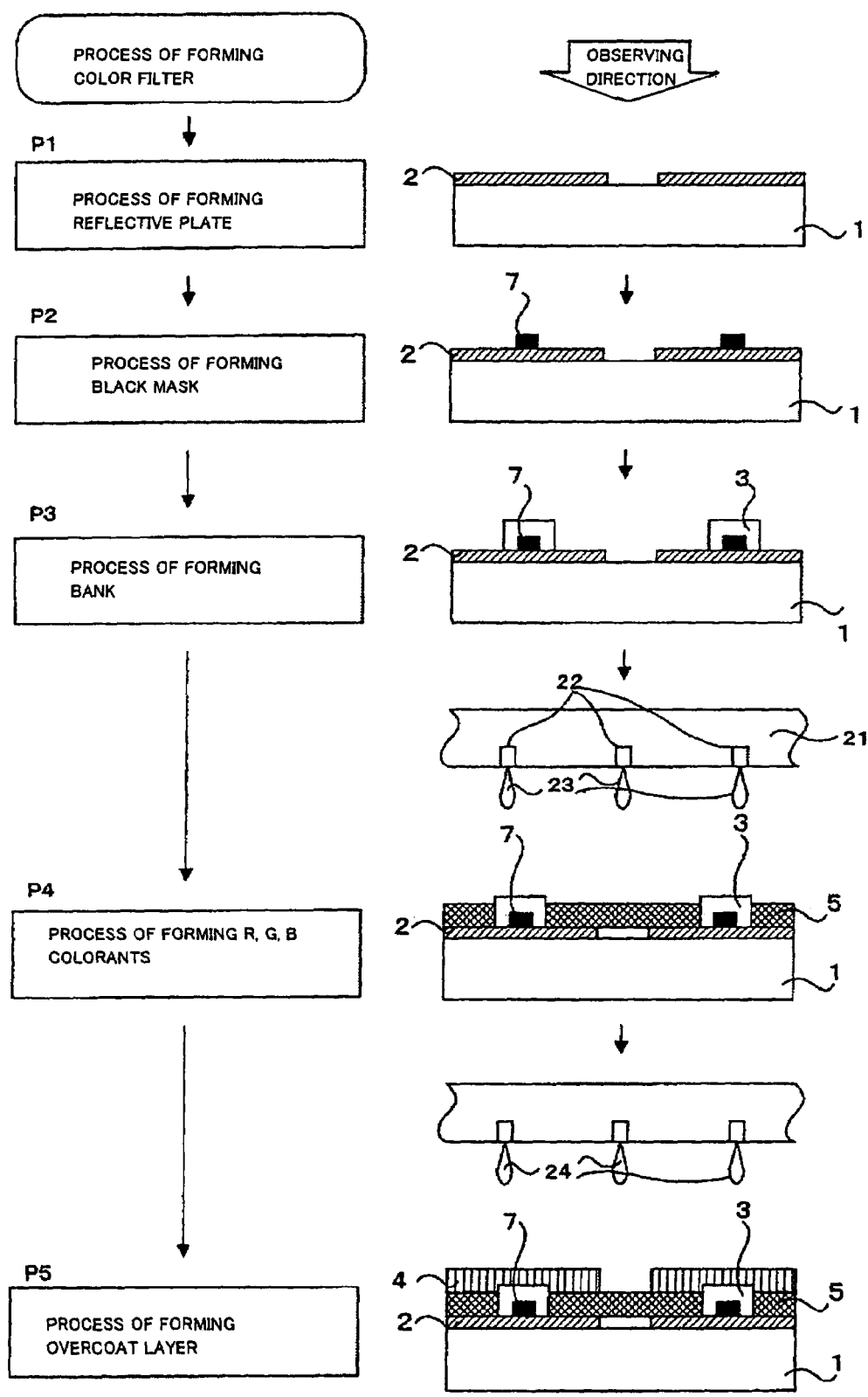
FIG. 10 is a process chart illustrating a process of manufacturing the color filter substrate of the present invention.

FIG. 10 schematically illustrates a method of manufacturing the color filter substrate 100 according to the first embodiment of the present invention. Using a metal material, such as Al (aluminum), the reflective film 2 is formed in a lattice-shaped pattern on the surface of a mother substrate 1, such as a glass substrate or a plastic substrate, as seen from the observer side in the drawing.

This reflective film 2 is uniformly formed to have a preferable thickness by a certain film formation method, for example, the sputtering method, and then is formed in the lattice shape by a proper patterning method, for example, the photolithography method (process P1).

After forming the reflective film 2, the black masks 7 are formed in a process P2. The black masks 7 are provided to obtain the excellent contrast of display, and the black masks 7 are formed in a lattice-shaped pattern in which the portions corresponding to the respective dot regions are opened. In addition, the black masks may be made of a metal film, such as Cr (chrome), or a resin to which a black pigment or a pigment close to black is added.

Next, the bank layers 3 are formed in a process P3. Specifically, preferably the ink-shedding resin is applied with a predetermined thickness using, for example, the spin coating method, and then a predetermined lattice shape is formed using a proper patterning method, for example, the photolithography method. At that time, the widths of the bank layers 3 are set to be smaller than that of the reflective film 2 which is a Al film.

Thereafter, in a process P4, the coloring layers 5 with R, G and B colors are formed in the respective regions partitioned by the bank layers 3 using the inkjet method. Specifically, while scanning the surface of the mother substrate 1 with an inkjet head 21, a color filter material 23 is ejected as ink droplets from nozzles 22 provided in the inkjet head 21 to the predetermined positions corresponding to the arrangement pattern, and then adheres on the mother substrate 1 and the reflective film 2. Next, the color filter material 23 is solidified to form the coloring layers 5 by a sintering process, an ultra violet irradiation process, or a vacuum dry process. A color filter pattern having a desired arrangement is formed by repeating these processes for every color filter of R, G and B.

Thereafter, in a process P5, the overcoat layer 4 is formed on the coloring layers 5, which are regions partitioned by the bank layers 3, by the inkjet method. Specifically, similarly to the color filter, while scanning the surface of the mother substrate 1 using the inkjet head 21, an overcoat material 24 is ejected from the nozzles 22 provided in the inkjet head 21 to predetermined positions, and adheres onto the respective coloring layers 5 on the mother substrate 1. Thereafter, the overcoat material 24 is solidified to form the overcoat layer 4 by, for example, a sintering process at 200° C. for 30 to 60 minutes.

By patterning the overcoat layer 4 using a photolithography method, the thickness of the liquid crystal layer in the reflection region provided with the reflective film 2 is set to be smaller than that of the liquid crystal layer in the transmission region to form the so-called multi-gap type liquid crystal display panel.

Figure 6:
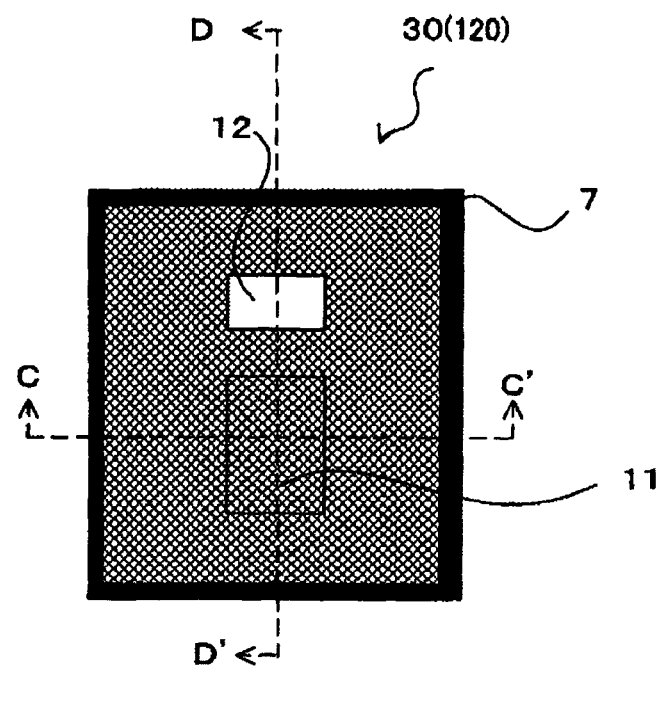
FIG. 6(a) is a plan view and FIGS. 6(b) and (c) are cross-sectional views of a dot portion in the color filter substrate shown in FIG. 5.
Figure 6:
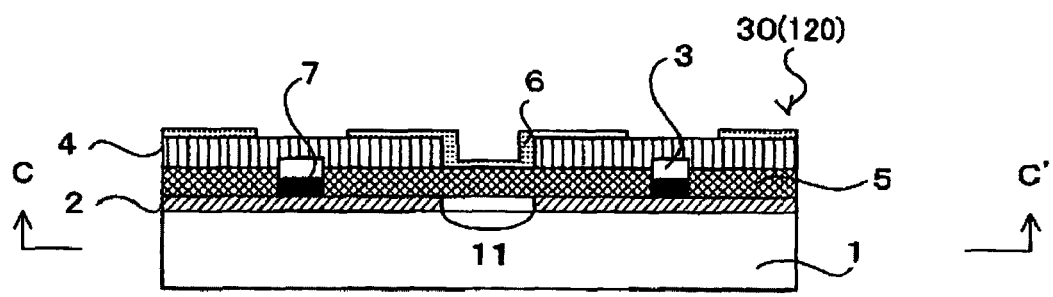
Figure 6:
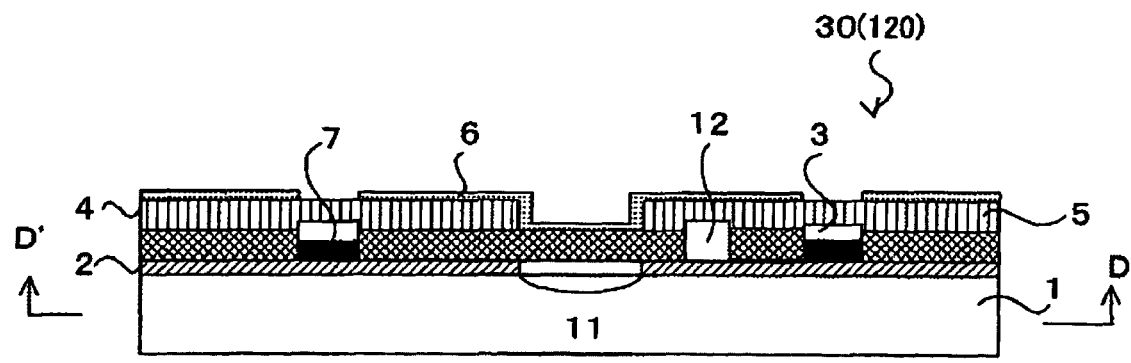

Up to now, the method of manufacturing the color filter substrate according to the first embodiment has been described. However, the color filter substrate 110 of the second embodiment shown in FIG. 4 can be manufactured using the same processes as the above processes except for the process P2 of forming the black masks. Furthermore, the color filter substrate 120 of the third embodiment shown in FIG. 6 can be manufactured using the same processes as the above processes, except that the island-shaped bank regions 12 shown in FIG. 6 are formed in the process P3 of forming the bank layers.

Method of Manufacturing Liquid Crystal Display Panel

Figure 11:
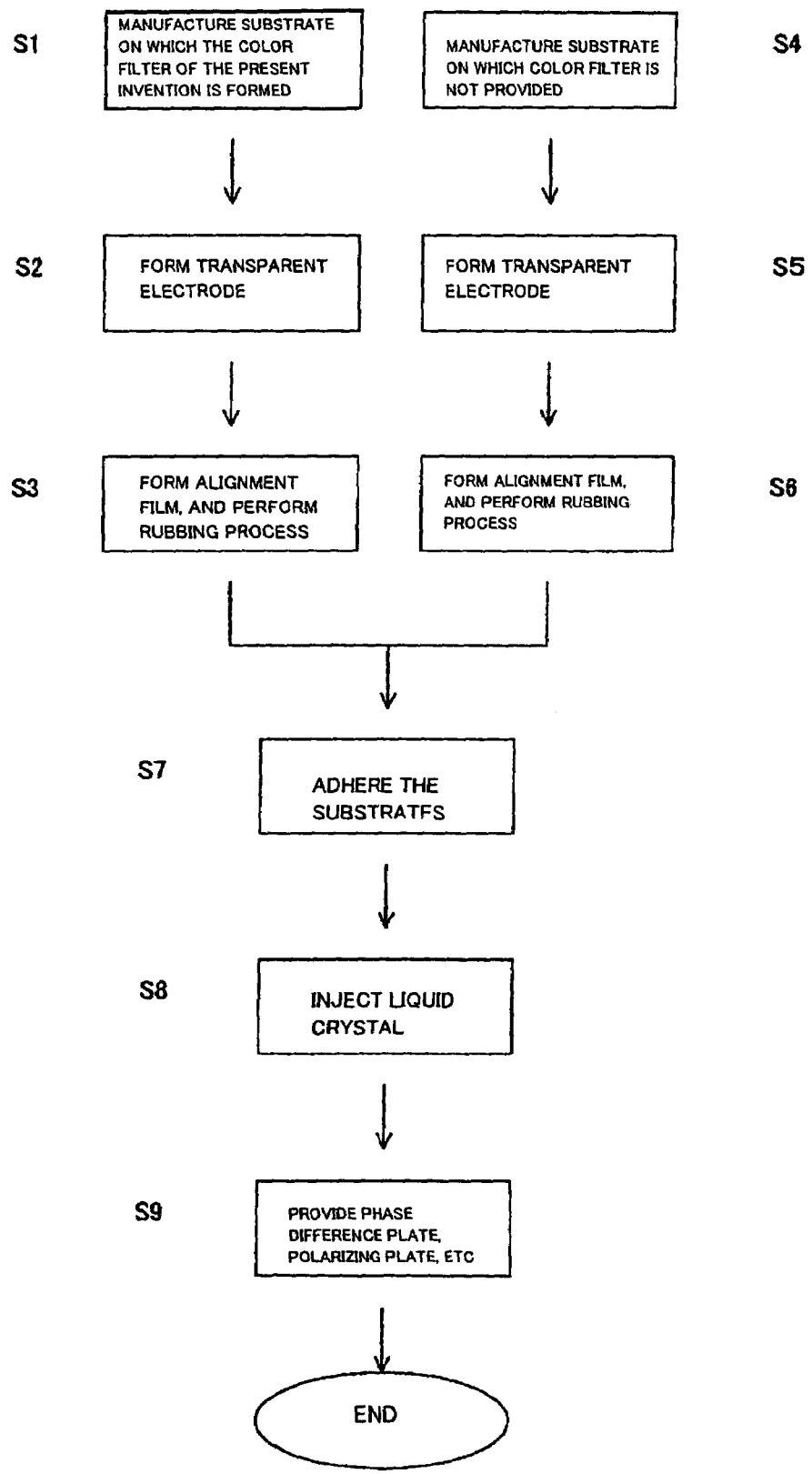
FIG. 11 is a process chart illustrating a method of manufacturing a liquid crystal display device equipped with the color filter substrate of the present invention.

Next, using the color filter substrate obtained from the above processes, a method of manufacturing the liquid crystal display panel shown in FIG. 9 will be described referring to FIG. 11. FIG. 11 is a flowchart illustrating the processes for manufacturing a display panel 200.

First, a substrate 31, in which the color filter substrate according to any one of the aforementioned embodiments is formed, is manufactured by the above method (step S1). Next, a transparent conductive film is formed on the overcoat layer by the sputtering method, and the transparent conductive film is patterned by the photolithography method to form the transparent electrode 6 (step S2). As shown in FIG. 2(b), The transparent electrode 6 is provided on the overcoat layer 4 and the bank layer 3, which is formed as the partitioning member, and the uncolored and bright reflected light is obtained from the transparent electrode 6. Thereafter, an alignment film made of, for example, a polyimide resin is formed on the transparent electrode, and then a rubbing process is carried out on the alignment film (step S3).

On the other hand, the opposite substrate is manufactured (step S4), and the transparent electrodes are formed in the same manner (step S5). Then, the alignment film (not shown) is formed on the transparent electrodes, and then the rubbing process is carried out on the alignment film (step S6).

Next, the aforementioned substrates 31 and 32 are bonded to each other through a sealing member 33 to form a panel structure (step S7). The substrate 31 and the substrate 32 are bonded at regular intervals by spacers (not shown) dispersively disposed between the substrates.

Thereafter, the liquid crystal is injected from an opening portion of the sealing member, and then the opening portion of the sealing member is sealed by a sealing member, such as a UV curable resin (step S8). After completing a main panel structure through the above steps, the phase difference plate or the polarizing plate adheres onto the external surface of the panel structure using, for example, a bonding agent if necessary (step S9), and then the liquid crystal display panel 200 shown in FIG. 9 is completed.

Electronic Apparatus

Figure 12:
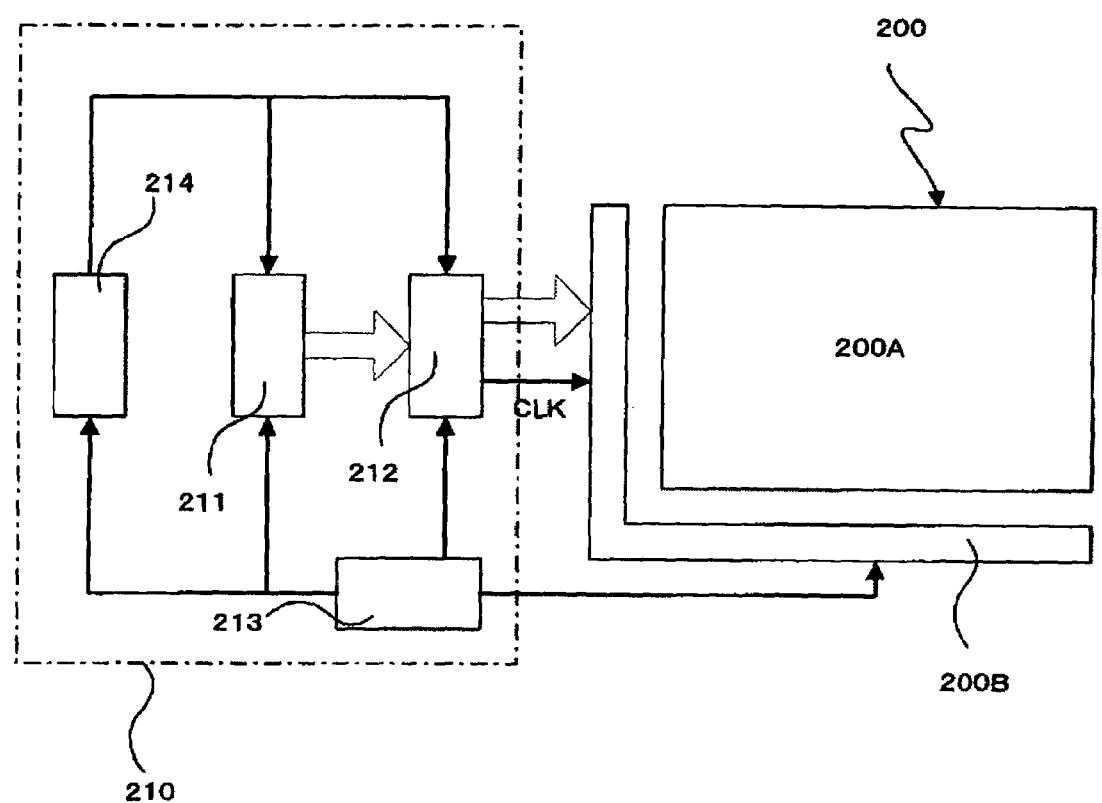
FIG. 12 is a block diagram schematically illustrating a constitution of an electronic apparatus according to the present invention.

Next, an embodiment in which the liquid crystal display panel employing a high-quality color filter according to the present invention is used as a display unit of an electronic apparatus will be described. FIG. 12 is a block diagram schematically illustrating the overall constitution of this embodiment. The electronic apparatus shown FIG. 12 comprises the same liquid crystal display panel 200 as the aforementioned liquid crystal display panel 200 and a control means 210 for controlling the liquid crystal display panel 200. Herein, the liquid crystal display panel 200 is conceptually divided into a panel structure 200A and a driving circuit 200B consisting of a semiconductor IC and others. Furthermore, the control means 210 comprises a display information output source 211, a display information processing circuit 212, a power source circuit 213, and a timing generator 214.

The display information output source 211 comprises a memory, such as ROM (Read Only Memory) and RAM (Random Access Memory), a storage unit comprising a magnetic recording disk, a optical recording disk and the like, and a tuning circuit for tuning and outputting a digital image signal, and has a function to supply the display information in the form of image signals having a predetermined format to the display information processing circuit 212 on the basis of various clock signals generated by the timing generator 214.

The display information processing circuit 212 comprises various well-known circuits, such as a serial-parallel converting circuit, an amplifying/inverting circuit, a rotation circuit, a gamma-correction circuit, and a clamp circuit, and processes the input display information to supply the image information to the driving circuit 200B together with the clock signal CLK. The driving circuit 200B includes a scanning line driving circuit, a data line driving circuit, and a test circuit. Furthermore, the power source circuit 213 supplies a predetermined voltage to each of the elements described above.

Figure 13:
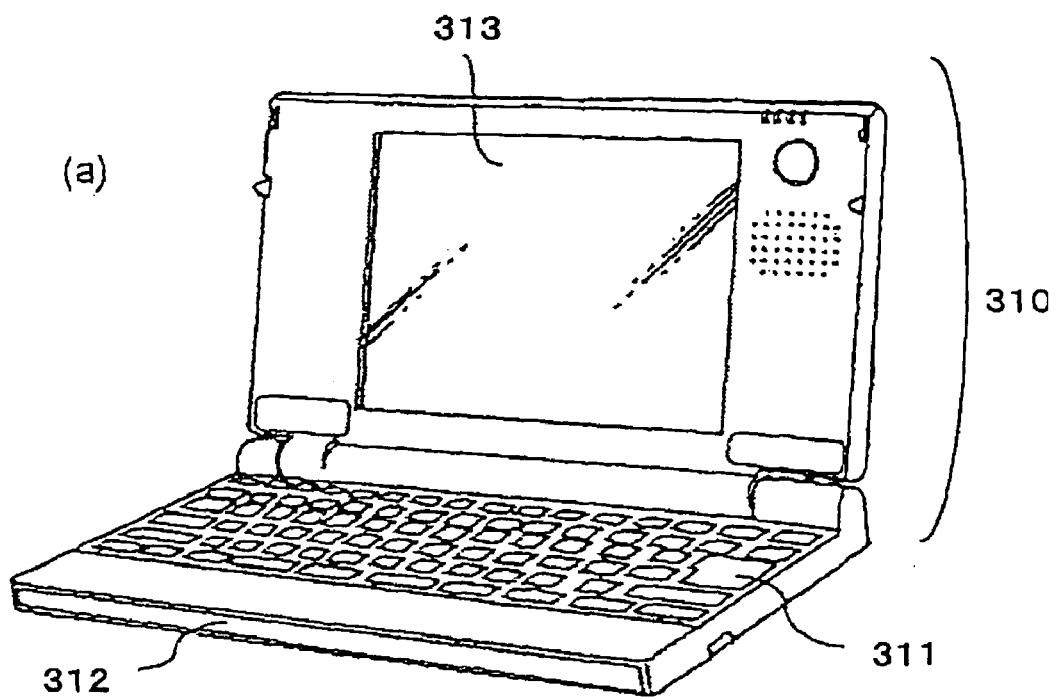
FIGS. 13(a) and (b) are views illustrating examples of electronic apparatuses to which the liquid crystal display panel according to the embodiment of the present invention applies.
Figure 13:
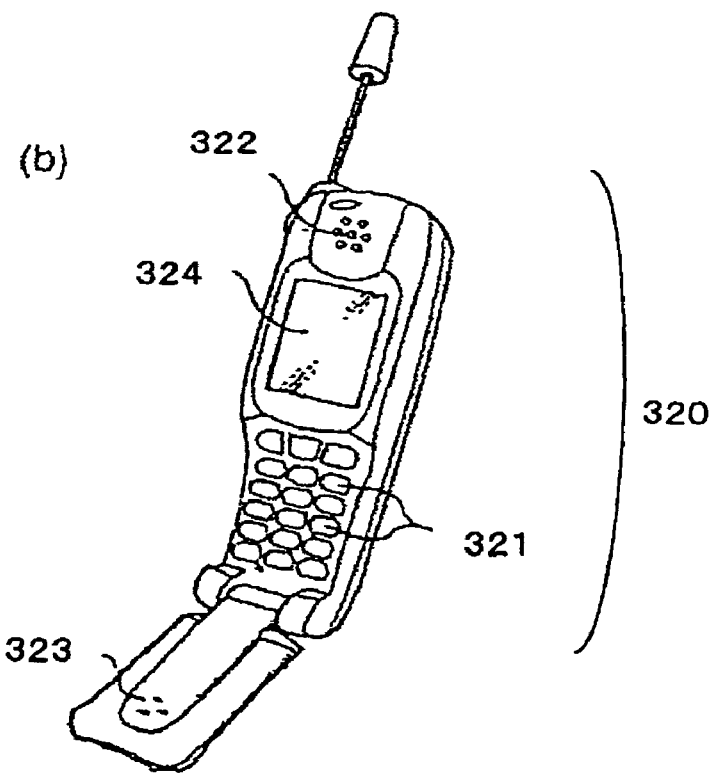

Next, a specific example of an electronic apparatus to which the liquid crystal display panel according to the present invention can apply will be described referring to FIG. 13.

First, an example in which the liquid crystal display panel according to the present invention applies to a display unit of a portable personal computer (a so-called notebook-sized personal computer) will be described. FIG. 13(a) is a perspective view illustrating a constitution of the personal computer. As shown in FIG. 13(a), the personal computer 310 comprises a main body unit 312 comprising a key board 311 and a display unit 313 to which the liquid crystal display panel according to the present invention applies.

Subsequently, an example in which the liquid crystal display panel according to the present invention applies to a display unit of a mobile phone will be described. FIG. 13(b) is a perspective view illustrating a constitution of the mobile phone.

As shown in FIG. 13(b), the mobile phone 320 comprises a plurality of operating buttons 321, a receiver 322, a transmitter 323, and a display unit 324 to which the liquid crystal display panel according to the present invention applies.

Furthermore, the electronic apparatus to which the liquid crystal display panel according to the present invention can apply can include, among others, a liquid crystal television, a view finder type or monitor direct view type video tape recorder, a car navigation apparatus, a pager, an electronic organizer, a calculator, a word processor, a workstation, a television phone, a POS terminal, a digital still camera and the like, in addition to the personal computer shown in FIG. 13(a) and the mobile phone shown in FIG. 13(b).

Various Modifications

Furthermore, the electro-optical device according to the present invention can similarly apply to an active matrix liquid crystal display panel (for example, a liquid crystal display panel including a thin film transistor (TFT) or a thin film diode (TFD) as a switching element) as well as to the passive matrix liquid crystal panel. Furthermore, the present invention can similarly apply to various electro-optical devices, such as an electroluminescence device, an organic electroluminescence device, a plasma display device, an electrophoresis display device, a field emission display (an electron discharge display device), a surface conduction electron emitter display, as well as to the liquid crystal display panel.

The entire disclosure of Japanese Patent Application Nos. 2002-230291 filed Aug. 7, 2002 and 2003-198705 filed Jul. 17, 2003 is incorporated by reference.

What is claimed is:

1. A color filter comprising:
   a substrate;
   dot portions each including a transmission region and a reflection region;
   coloring layers each formed in a corresponding dot portion;
   a partition layer formed from a substantially transparent photosensitive resin, the partition layer partitioning a coloring layer formed in one dot from a coloring layer formed in a dot adjacent to the one dot, the partitioning layer having an upper surface that protrudes further away from the substrate than the coloring layer that is formed in the one dot and the coloring layer that is formed in the adjacent dot; and
   a reflection layer that reflects light and that is located at the reflection region of each dot portion, the reflection layer two-dimensionally overlapping the coloring layer and two-dimensionally overlapping the partition layer.

2. A color filter according to claim 1, wherein the partition layer is provided in a peripheral region of each dot portion corresponding to the reflection region.

3. A color filter according to claim 2, wherein the partition layer is also provided inside the peripheral region.

4. A color filter according to claim 2, wherein the partition layer is provided inside at least two opposite sides of the four circumferential sides of the peripheral region.

5. A color filter according to claim 1, wherein the area of the coloring layer in each of the dot portions is less than the total area of the transmission region and the reflection region in the dot portion.

6. A method of manufacturing a color filter substrate, the method comprising the steps of:
   forming a reflective layer on a surface of a substrate in a direction following the surface of the substrate;
   forming a black mask in a region corresponding to a light-shielding region on the reflective layer;
   forming a partition layer having a greater width in the direction following the surface of the substrate than the black mask to cover the black mask; and
   ejecting liquid droplet material within a plurality of regions partitioned by the partition layer to form coloring layers in the plurality of regions partitioned by the partition layer.

* * * * *